Figure 1:
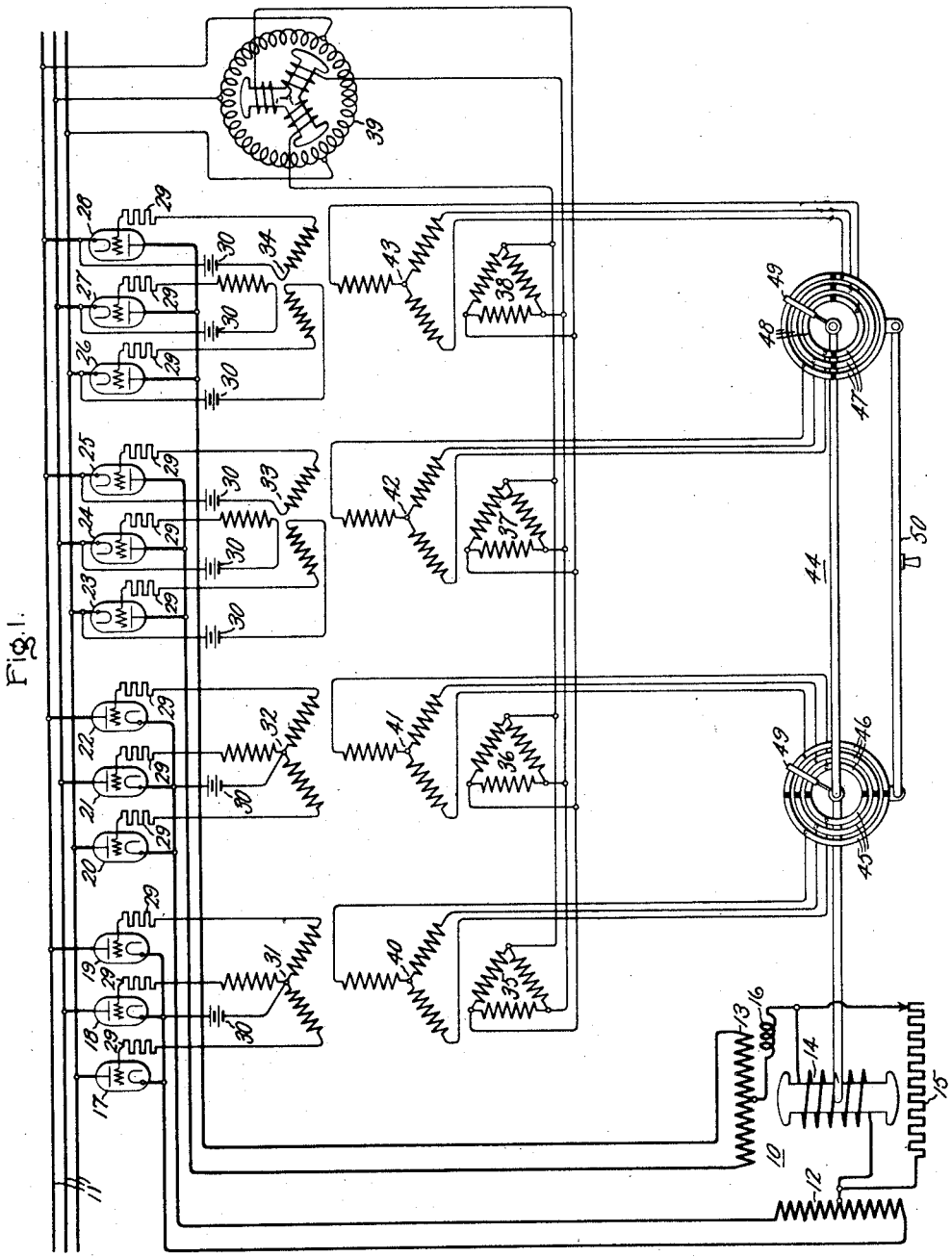

Inventors:
Camil A. Sabbah,
Marvin M. Morack,
by Harry E. Dunham
Their Attorney.

Patented May 1, 1934

1,957,231

UNITED STATES PATENT OFFICE 1,957,231

ELECTRIC VALVE CONVERTING SYSTEM AND EXCITATION APPARATUS THEREFOR

Camil A. Sabbah and Marvin M. Morack, Schenectady, N. Y., assignors to General Electric Company, a corporation of New York Application August 2, 1933, Serial No. 683,339

8 Claims. (Cl. 172—120)

Our invention relates to improved electric valve converting systems and more particularly to new and improved apparatus for exciting the control elements of the electric valves of such systems.

In many of the electric valve converting systems of the prior art, a plurality of valves, or groups of valves, interconnect the several terminals of a supply circuit with each of the terminals of a load circuit and the electric valves are rendered conductive in a predetermined sequence to supply current to their respective terminals of the load circuit by means of a distributor mechanism driven at a speed corresponding to the frequency at which it is desired to energize the load circuit. The use of electric valves of the vapor electric discharge type has found increasing favor in such systems because of the relatively large amounts of power which may be handled at ordinary operating voltages. The energy requirements of the control circuits of valves of this type, however, may exceed those which can be handled satisfactorily with the ordinary mechanical distributors or commutators of the prior art in systems in which the control circuits of the several electric valves are successively opened and closed by the distributor.

It is an object of our invention, therefore, to provide an improved electric valve converting system and an excitation apparatus therefor which will overcome the above-mentioned disadvantages of the arrangements of the prior art and which will be simple and reliable in operation.

It is another object of our invention to provide an improved excitation apparatus for an electric valve converting system which will avoid the direct opening and closing of the control circuits of the several electric valves by a mechanical distributor apparatus.

In accordance with our invention the several terminals of a load circuit, such, for example, as a polyphase alternating current motor, are interconnected with a supply circuit through a plurality of electric valves. The control elements or grids of the valves are energized from the supply circuit through a plurality of control transformers and any suitable phase shifting means, such as a rotary phase shifting transformer. The several control transformers are provided with auxiliary or tertiary windings which are connected to be short circuited in a predetermined sequence by means of an auxiliary distributing mechanism rotated at a speed corresponding to the frequency which it is desired to supply the load circuit. In the case of a motor load, mentioned above, the distributor may be driven directly from the motor. Such an arrangement lends itself to a particularly simple distributing mechanism which may comprise a series of stationary contacts or segments, connected to the terminals of the tertiary windings of the control transformers, and a single rotating contact or brush operating to interconnect in a predetermined sequence the stationary contacts associated with a single control transformer. Due to the fact that the tertiary windings are electrically insulated from the rest of the circuit, the rotating contact or brush may be at ground potential and a single contact or brush may serve to successively interconnect all of the stationary contacts or brushes.

For a better understanding of our invention, together with other and further objects thereof, reference is had to the following description taken in connection with the accompanying drawings and its scope will be pointed out in the appended claims. Fig. 1 of the accompanying drawings diagrammatically illustrates an electric valve converting system embodying our invention for transmitting energy from a three-phase alternating-current supply circuit to a quarter-phase two-pole alternating-current motor, while Figs. 2 and 3 show details of the preferred form of our improved excitation apparatus.

Referring now more particularly to Fig. 1 of the drawings, there is illustrated an arrangement for operating at variable speed a quarter-phase motor 10 from a three-phase alternating-current supply circuit 11. The motor 10 may be of any of the several types well known in the art, although we have illustrated, by way of example, a motor of the synchronous type comprising armature phase windings 12 and 13 and a rotatable field winding 14. The field winding 14 may be connected in series with the armature windings, as illustrated, in case it is desired to give the motor series characteristics, or, in case shunt characteristics are desired, the field winding may be separately excited in any well known manner. As illustrated, the field winding 14 is connected between the electrical neutrals of the phase windings 12 and 13, a circuit which carries unidirectional current, as will be explained more fully hereinafter. A variable resistor 15 may be connected across the field winding 14 to regulate the speed-torque characteristics of the motor, in which case it is preferable also to include a reactor 16 in series with the parallel connected winding 14 and resistor 15. The terminals of the armature phase winding 12 are connected to the several phases of the supply circuit 11 through two groups of similarly connected electric valves, 17—18—19, and 20—21—22, respectively. Similarly, the armature phase winding 13 is connected to the supply circuit 11 through two groups of electric valves 23—24—25 and 26—27—28, connected to the circuit 11 with a polarity opposite to that of the electric valves 17–22, inc. Each of the electric valves 17–28, inc., is provided with an anode, a cathode, and a control element, or grid, and may be of any of the several types well known in the art, although we prefer to use valves of the vapor or gaseous electric discharge type.

In order to control the conductivity of the several electric valves the control element, or grid, of each of the valves is connected to its respective cathode through a current limiting resistor 29, a negative bias battery 30 and the proper phase winding of one of the secondary networks 31–34, inc., of the control transformers, the primary networks 35–38, inc., respectively, of which are energized from the alternating current circiut 11 through any suitable phase shifting means, such as a rotary phase shifting transformer 39. The control transformers 31—35, 32—36, etc., are provided with tertiary, or auxiliary, networks 40–43 inc., respectively, and these tertiary networks are connected to be short circuited in a predetermined sequency by means of a distributor mechanism 44. The mechanism 44 comprises four groups of stationary contacts or segments 45, 46, 47 and 48, each group consisting of there segments and the groups of segments being connected, respectively, to the terminals of the tertiary networks 40–43, inc. Each of the segments of the mechanism 44 is 180 electrical degrees in length, when applied to the two-pole quarter-phase motor 10. However, for load circuits of other numbers of phases, the lengths of the stationary segments will vary correspondingly. The mechanism 44 also includes a single rotating contact or brush apparatus 49, connected to be rotated by the motor 10 and mounted in juxtaposition to the groups of segments 45–48, inc., successively to interconnect the segments of each group. If desired, a phase adjusting mechanism 50 may be provided for the stationary groups of segments to vary the speed-torque characteristics of the motor or to reverse its direction of rotation, as explained more fully hereinafter. However, this feature of controlling the conductivity of a group of electric valves by a distributor mechanism driven by a motor energized through the valves forms no part of my present invention, but is disclosed and broadly claimed in a copending application of E. F. W. Alexanderson, Serial No. 638,361, filed May 11, 1923, and assigned to the same assignee as the present application.

Figure 2:
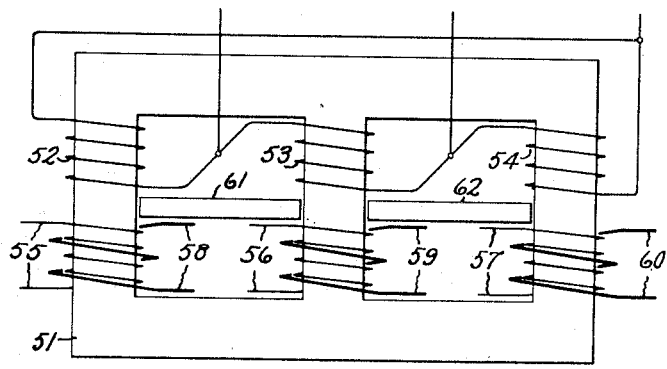
Figure 3:
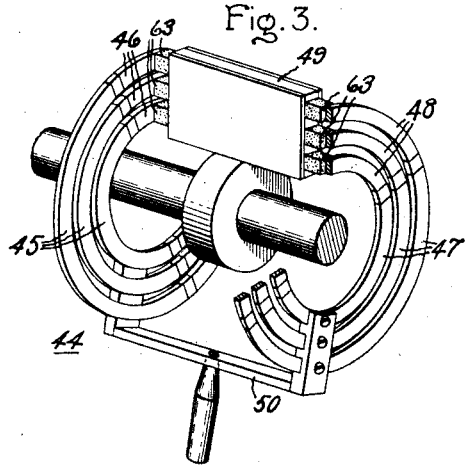

In Fig. 2, there is shown a preferred arrangement which the control transformers may take, although it is to be understood that this is clearly illustrative and that any well known equivalent arrangement may be utilized. Each of the control transformers, as illustrated in Fig. 2, comprises a three-phase magnetic-core member 51 upon the several legs of which are mounted the primary windings 52, 53 and 54. Upon the same legs as the windings 52, 53 and 54 are mounted the secondary windings 55, 56 and 57, respectively, and preferably interwound with the secondary windings are the tertiary or auxiliary windings 58, 59 and 60, respectively. Magnetic shunts 61 and 62 may be provided interconnecting the legs of the core 51 through air gaps to limit the primary current of the transformer when the secondary windings are short circuited, although it will be obvious that this function may be accomplished by impedance devices connected in series with the primary windings, if desired.

In Fig. 3 is shown one form which the distributor mechanism 44 of Fig. 1 may take. The single conductive rotatable contact or brush apparatus 49 is mounted directly on the shaft of the motor and is provided with a plurality of brush elements 63, which cooperate with the stationary contacts, or segments, 45, 46, 47 and 48 to interconnect the segments of each group in a predetermined sequence, thus short circuiting the tertiary windings of the control transformers, as described above.

The general principles of operation of the above-described apparatus for transmitting energy from the alternating current circuit 11 to the motor 10 will be well understood by those skilled in the art. In brief, it will be assumed that the motor field member 14 and the distributor mechanism 44 are in substantially the positions illustrated and that the rotary phase shifting transformer 31 is so adjusted that the potentials impressed upon the grids of the several electric valves through their associated transformers are substantially in phase with their anode potentials. Under these conditions, it will be seen that the groups of segments 46 and 48 of the mechanism 44 are interconnected through the rotating contact apparatus 49 so that the tertiary networks 41 and 42 of the control transformers 32—36 and 33—37 are short circuited thereby. The result is that the control circuits of the groups of electric valves 20—21—22 and 23—24—25 are substantially deenergized and these valves are maintained non-conductive by the negative bias batteries 30, although in the case of electric valves having positive critical grid potential characteristics, it will be understood by those skilled in the art that the negative bias batteries may be omitted. At the same time the grids of the groups of valves 17—18—19 and 26—27—28 are energized from their associated control transformers 31—35 and 34—38 and these two groups of valves comprise a three-phase full wave rectifier circuit, of which the unidirectional current circuit comprises the lower half of the armature phase winding 12, the field winding 14, reactor 16, and the right-hand portion of the armature winding 13.

The resultant motor field created by current flowing in the armature windings 12 and 13, as just described, is in such a direction as to produce a torque upon the motor field 14 and initiate rotation of the motor, which, it will be assumed, is in a clockwise direction. When the motor has rotated through something less than 90 electrical degrees, the rotating brush apparatus 49 will leave the group of segments 48 and make contact with the group of segments 47, thus opening the short circuit on the tertiary network 42 and establishing a short circuit on the tertiary network 43. The result is that the control circuits of the group of electric valves 26—27—28 are deenergized so that these valves are maintained non-conductive by their respective negative bias batteries, while the control circuits of the electric valves 23—24—25 are energized to render these valves conductive. In this way, current is transferred from the left-hand terminal to the right-hand terminal of the armature phase winding 13 to advance the armature magneto-motive force of the motor 10 by substantially 90 electrical degrees and produce a torque upon the motor field 14 to rotate it through an additional 90 degrees. In a similar manner, current is successively commutated between the several terminals of the armature windings 12 and 13 to produce a rotating armature magnetomotive force and a rotation of the motor 10. The distributor mechanism 44 serves to open the short circuits of the tertiary networks of the control transformers associated with only those groups of valves which are connected to the armature windings of the motor 10 in a torque producing position with respect to the motor field 14 at any particular instant. By a proper design of the control transformers, shown in detail in Fig. 2, the amount of energy required to be interrupted by the rotatable contact apparatus 49 may be reduced to any desired value.

As is well understood by those skilled in the art, the average voltage impressed upon the armature windings 12 and 13 may be reduced under starting conditions by retarding the phase of the potentials applied to the control transformers 31—35, 32—36, etc., by means of the rotary phase shifting transformer 39, an operation well known in the art. By gradually advancing the phase of the grid potentials by the rotary phase shifting transformer 31, the average voltage impressed upon the armature windings of the motor 10 may be increased to increase the speed of the motor. Additional speed control may be obtained by adjusting the variable resistor connected in parallel with the field winding 14 or by the phase adjusting mechanism 50 of the distributor 44. By operating the phase adjusting mechanism 50 through an angle of approximately 180 electrical degrees, the direction of rotation of the motor will be reversed. With the above-described arrangement, the motor 10, although having structural characteristics of an alternating current synchronous motor, is given speed torque characteristics similar to those of a direct current series motor.

While we have described what we at present consider the preferred embodiment of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States, is,—

1. In a controlled electric valve converting system, apparatus for exciting the control elements of the valves of the system in a predetermined sequence comprising a control circuit for each of said valves, a transformer winding included in each of said control circuits for energizing the same, an auxiliary winding inductively coupled to each of said transformer windings, and means for successively short circuiting said auxiliary windings to deenergize said control circuits.

2. In a controlled electric valve converting system for transmitting energy from an alternating current supply circuit to a load circuit, apparatus for exciting the control elements of the valves of the system in a predetermined sequence comprising a control circuit for each of said valves, a plurality of transformers for energizing said control circuits from said supply circuit, a plurality of auxiliary windings for said transformers, and distributor means for successively short circuiting said auxiliary windings to deenergize said control circuits.

3. In a controlled electric valve converting system for transmitting energy from an alternating current supply circuit to a load circuit, apparatus for exciting the control elements of the valves of the system in a predetermined sequence comprising a control circuit for each of said valves, a plurality of transformers each provided with a primary winding for connection to said supply circuit and with a secondary winding, one of said secondary windings being included in each of said control circuits, a tertiary winding for each of said transformers, and distributor means for successively short circuiting said tertiary windings to deenergize said control circuits.

4. In a controlled electric valve converting system, apparatus for exciting the control elements of the valves of the system in a predetermined sequence comprising a control circuit for each of said valves, a transformer winding included in each of said control circuits for energizing the same, an auxiliary winding inductively coupled to each of said transformer windings, a distributor mechanism comprising a single rotatable contact element and a plurality of groups of stationary contacts arranged in cooperative relation to said rotatable contact, each of said stationary contacts being connected to a terminal of one of said auxiliary windings, and means for rotating said rotatable contact successively to interconnect the stationary contacts of each group.

5. In a controlled electric valve converting system including a plurality of groups of electric valves, apparatus for exciting the control elements of the groups of valves of the system in a predetermined sequence comprising a control circuit for each of said valves, a transformer winding included in each of said control circuits for energizing the same, an auxiliary winding inductively coupled to each of said transformer windings, a distributor mechanism comprising a single rotatable contact element and a plurality of groups of stationary contacts, said groups of stationary contacts being angularly displaced in juxtaposition to the path of rotation of said rotatable contact, the stationary contacts of each group being connected to the terminals of said auxiliary windings associated with the control circuits of one of the groups of valves of the system, and means for rotating said rotatable contact successively to interconnect the stationary contacts of each group.

6. In a controlled electric valve converting system for transmitting energy from a primary alternating current circuit to a secondary alternating current circuit, apparatus for exciting the control elements of the valves of the system in a predetermined sequence comprising a control circuit for each of said valves, a plurality of transformers for energizing said control circuits at the frequency of said primary circuit, a plurality of auxiliary windings for said transformers, and means for successively short circuiting said auxiliary windings at the frequency of said secondary circuit to deenergize said control circuits.

7. In a controlled electric valve converting system for transmitting energy from an alternating current circuit to an alternating current motor, apparatus for exciting the control elements of the valves of the system in a predetermined sequence comprising a control circuit for each of said valves, a plurality of transformers for energizing said control circuits from said alternating current circuit, a plurality of auxiliary windings for said transformers, and distributor means driven by said motor for successively short circuiting said auxiliary windings to deenergize said control circuits.

8. In combination, a supply circuit, a load circuit provided with a plurality of terminals, a plurality of electric valves interconnecting said supply circuit and the several terminals of said load circuit, each of said valves being provided with a control element, a control circuit for each of said valves, a transformer winding included in each of said control circuits for energizing the same, an auxiliary winding inductively coupled to each of said transformer windings, and means for successively short circuiting said auxiliary windings to deenergize said control circuits.

CAMIL A. SABBAH.
MARVIN M. MORACK.